United States Patent
Kosugi (10) Patent No.: US 8,201,470 B2
(45) Date of Patent: Jun. 19, 2012

(54) ELECTRONICALLY CONTROLLED TRANSMISSION WITH STRUCTURE FOR RELIABLE SHIFTING TO A NEUTRAL POSITION

(75) Inventor: Makoto Kosugi, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 499 days.

(21) Appl. No.: 12/379,173

(22) Filed: Feb. 13, 2009

(65) Prior Publication Data

US 2009/0205455 A1 Aug. 20, 2009

(30) Foreign Application Priority Data

Feb. 19, 2008 (JP) .................. 2008-037369

(51) Int. Cl.
*F16H 3/08* (2006.01)
(52) U.S. Cl. ........................................... 74/329
(58) Field of Classification Search .............. 123/197.1
See application file for complete search history.

(56) References Cited

U.S. PATENT DOCUMENTS

| | | | | |
|---|---|---|---|---|
| 5,456,643 | A * | 10/1995 | Yamamoto et al. | 477/110 |
| 6,173,624 | B1 * | 1/2001 | Decker | 74/473.37 |
| 7,059,210 | B2 * | 6/2006 | Thiessen et al. | 74/337.5 |
| 7,134,355 | B2 * | 11/2006 | Eriksson et al. | 74/333 |
| 2005/0160848 | A1 | 7/2005 | Thiessen et al. | |

FOREIGN PATENT DOCUMENTS

| | | |
|---|---|---|
| EP | 0 573 901 A1 | 12/1993 |
| JP | 6-123355 | 5/1994 |
| JP | 06-123355 | 5/1994 |
| WO | WO 00/73679 A1 | 12/2000 |

\* cited by examiner

*Primary Examiner* — David D Le
*Assistant Examiner* — David J Hlavka
(74) *Attorney, Agent, or Firm* — Rabin & Berdo, P.C.

(57) ABSTRACT

A vehicle transmission can comprise a plurality of gears, and a shift cam coupled to the gears to at least partly control shifting of the gears. The shift cam comprise a plurality of grooves each with respective positions corresponding to gear speeds, and further including a neutral position, wherein the neutral position is below a position corresponding to a lowest gear speed in a view of at least a portion of the shift cam. A rotation angle of the shift cam between the neutral position and a lowest step corresponding to the lowest gear speed can be different from that between any adjacent shift steps, respectively corresponding to other gear speeds.

17 Claims, 10 Drawing Sheets

RELATED ART

ELECTRONICALLY CONTROLLED TRANSMISSION WITH STRUCTURE FOR RELIABLE SHIFTING TO A NEUTRAL POSITION

CROSS-REFERENCE TO RELATED APPLICATION

This application claims priority under 35 U.S.C. §119 from Japanese Patent Application No. 2008-037369, filed Feb. 19, 2008, the entirety of which is incorporated herein by reference.

BACKGROUND OF THE INVENTION

1. Technical Field

Embodiments of the present invention relate to an electronically controlled transmission for a vehicle, for example a straddle-type vehicle such as a motorcycle. More specifically, the embodiments relate to an electronically controlled transmission including structures for reliably shifting to a neutral position.

2. Background Art

Figure 7:
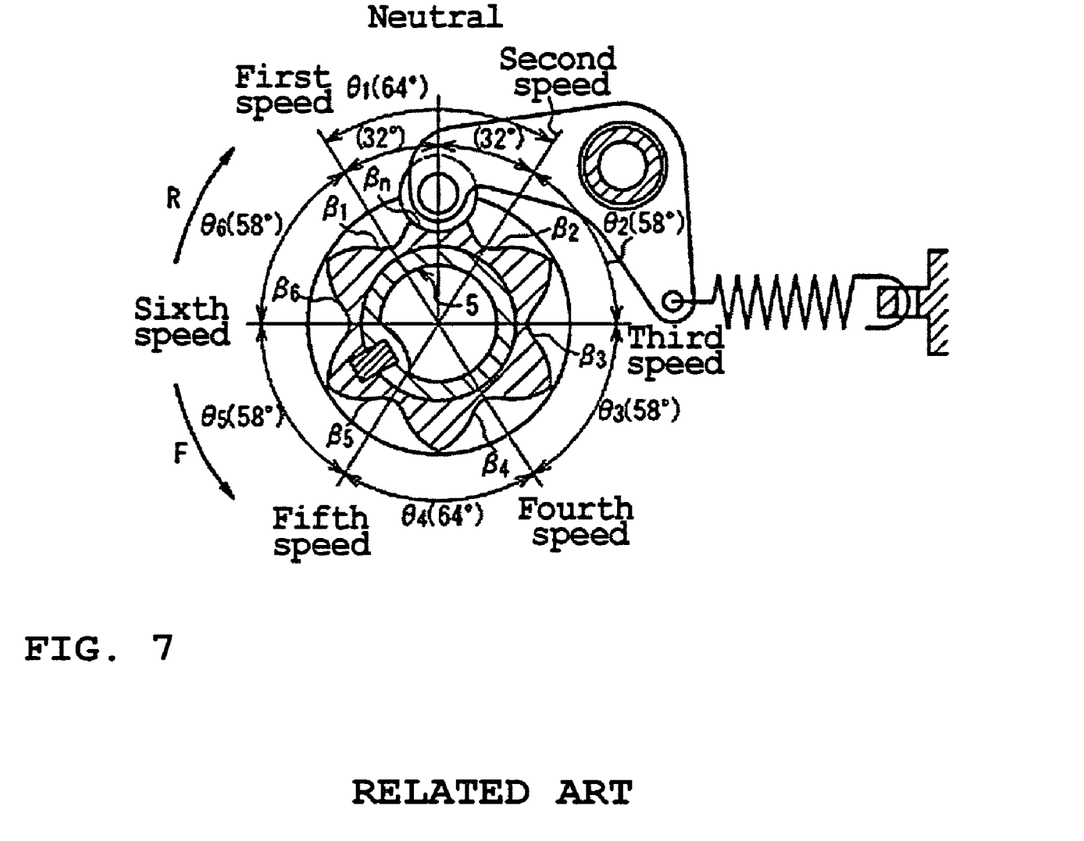
FIG. 7 is a front view showing a part of a conventional transmission.

A conventional "return-type" transmission is disclosed, for example, in JP-A-Hei 6-123355. The return-type transmission disclosed in JP-A-Hei 6-123355 is a manual transmission used in a motorcycle. FIG. 7 of the present application shows the return-type transmission disclosed in JP-A-Hei 6-123355. As shown in FIG. 7, the return-type transmission has a shift pattern in which a neutral position is disposed between a first speed position and a second speed position. A gear change is effected when a gear shift cam 5, which is rotated due to a shift operation by a driver of the motorcycle, sequentially changes its shift position by rotating in steps in the forward direction F and the reverse direction R. The six-speed return-type transmission disclosed in JP-A-Hei 6-123355 has a feature wherein a rotation angle $\theta 1$ of the gear shift cam 5 between the first speed position and the second speed position is larger than rotation angles $\theta 2$, $\theta 3$ . . . $\theta 6$ between other shift positions, and the neutral position is provided on a position rotated by half of the rotation angle $\theta 1$ between the first speed position and the second speed position.

SUMMARY OF THE INVENTION

Embodiments of the present invention relate to a return-type electronically controlled transmission capable of shifting to a neutral position reliably. The transmission can be provided in a vehicle, for example, a straddle-type vehicle such as a motorcycle.

In embodiments, the return-type electronically controlled transmission can be connected to a crank shaft of an engine via a clutch. The transmission can include a main shaft for rotating in accordance with rotation of the crank shaft via the clutch. The main shaft can be disposed substantially parallel to the crank shaft. The transmission can further include a drive shaft for rotating in accordance with rotation of the main shaft. The drive shaft can be disposed substantially parallel to the main shaft.

The transmission can further include a plurality of first gears for rotating about the main shaft, and a plurality of second gears for rotating about the drive shaft to engage with the plurality of first gears. The plurality of first gears can rotate about a center of the main shaft, and the plurality of second gears can rotate about a center of the drive shaft to mesh with the plurality of first gears. The transmission can further include a plurality of shift forks for moving a gear of the plurality of first gears in an axial direction of the main shaft and moving a gear of the plurality of second gears in an axial direction of the drive shaft. The transmission can still further include a plurality of fork shafts for supporting the plurality of shift forks.

The transmission can still further include a shift cam provided with a plurality of grooves, the shift cam for executing a designated rotation about an axis thereof. The axis of the shift cam can be substantially parallel to either of the main shaft and the drive shaft.

The transmission can still further include a clutch actuator for operating the clutch. The clutch actuator can connect or disconnect the clutch from the crankshaft. The transmission can still further include a shift actuator for rotating the shift cam, and a control device for controlling the clutch actuator and the shift actuator.

In the transmission, a plurality of shift steps can be set in accordance with at least a shape of the plurality of grooves. A neutral position can be set below a lowest step of the shift steps, and a rotation angle of the shift cam between the neutral position and the lowest step can be different from that between any adjacent shift steps.

Embodiments of the invention further relate to a vehicle transmission, comprising a plurality of gears, and a shift cam that can be coupled to the gears to at least partly control shifting of the gears. The shift cam can comprise a plurality of grooves each with respective positions corresponding to gear speeds, and further include a neutral position, wherein the neutral position is below a position corresponding to a lowest gear speed in a view of at least a portion of the shift cam, and is between a position corresponding to the lowest gear speed and a position corresponding to a highest gear speed.

According to embodiments of the invention as described above, it is possible to provide a return-type electronically controlled transmission capable of shifting to the neutral position reliably, and a straddle-type vehicle having the transmission.

BRIEF DESCRIPTION OF THE DRAWINGS

FIGS. 4A and 4B show a neutral position of a shift pattern of a transmission according to the embodiments, wherein, more specifically.

FIGS. 5A and 5B show a first speed position of the shift pattern of the transmission, wherein, more specifically.

FIGS. 6A and 6B show a second speed position of the shift pattern of the transmission, wherein, more specifically.

DETAILED DESCRIPTION OF THE INVENTION

The invention will now be described in more detail by way of example with reference to the embodiments shown in the accompanying Figures. It should be kept in mind that the following described embodiments are only presented by way of example and should not be construed as limiting the inventive concept to any particular physical configuration. It should further be understood that "exemplary" as used herein means "serving as an example, instance or illustration." Any aspect referred to herein as "exemplary" is not necessarily to be construed as preferred over other aspects.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially", "essentially" and "nearly", means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

Figure 1:
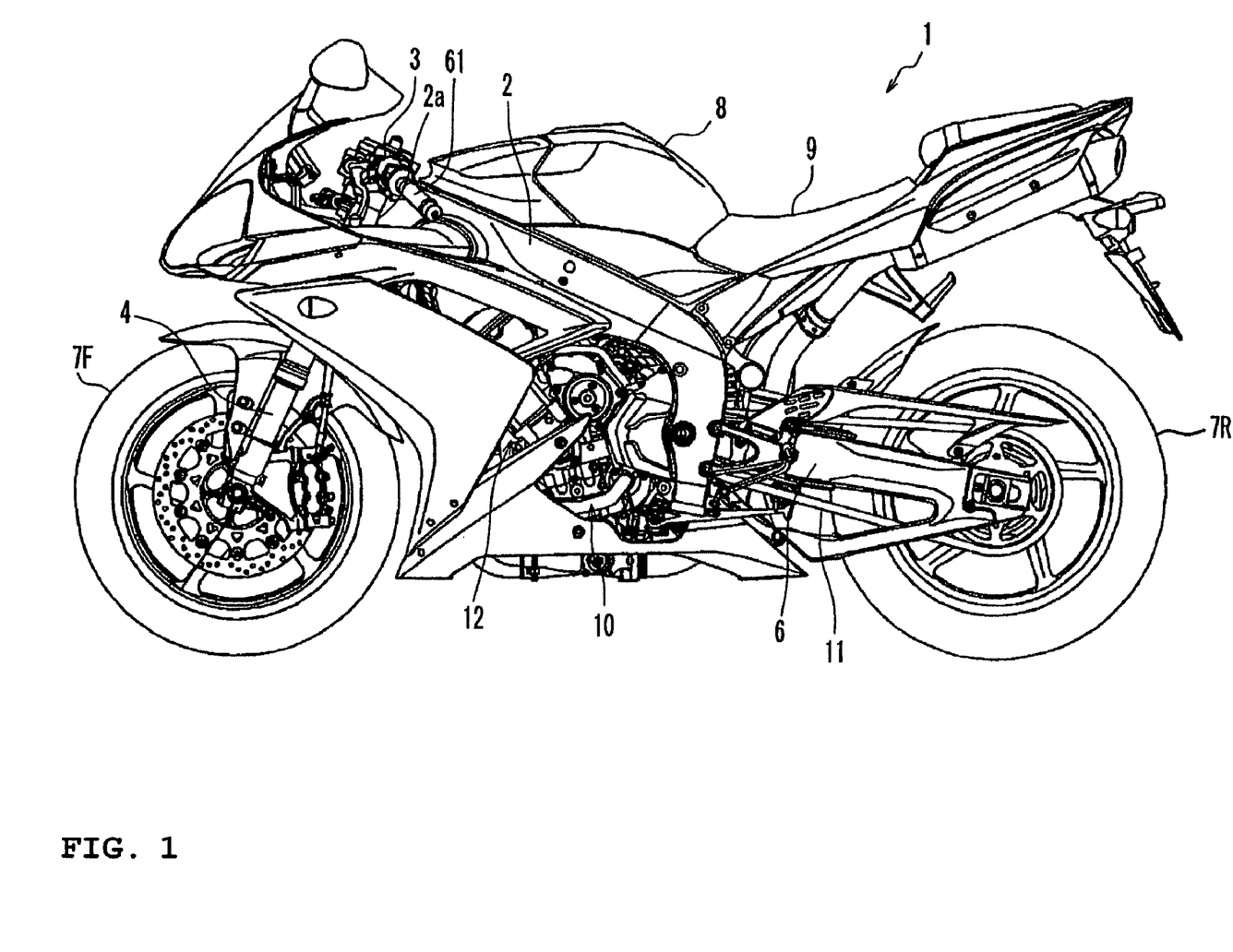
FIG. 1 is a left side view of a motorcycle according to embodiments of the invention.

FIG. 1 is a left side view of a motorcycle 1 according to an exemplary embodiment of the invention. In the following description, directions such as front, rear, left and right refer to directions as would be perceived by a rider sitting on a seat 9 and facing forward toward a front wheel 7F, for example.

The motorcycle 1 can include a body frame 2. The body frame 2 can include a head pipe 2a. A handlebar 3 can be mounted on an upper end of the head pipe 2a, and a front wheel 7F can be mounted to a lower end of the head pipe 2a through front forks 4 so as to be freely rotatable.

A swing arm 6 can be swingably attached to a rear end of the body frame 2. A rear wheel 7R can be mounted for rotation to the rear end of the swing arm 6.

The motorcycle 1 can further include a fuel tank 8. The seat 9 can be provided at the rear side of the fuel tank 8.

A power unit 10 can include an engine 12 as a driving source, suspended from the body frame 2. The power unit 10 can be connected to the rear wheel 7R through a power transmission means 11 such as a chain, a belt, and a drive shaft. This allows the power transmission means 11 to transmit driving force to the rear wheel 7R, the driving force being generated in the power unit 10 by the engine 12.

Clutch 14

Figure 2:
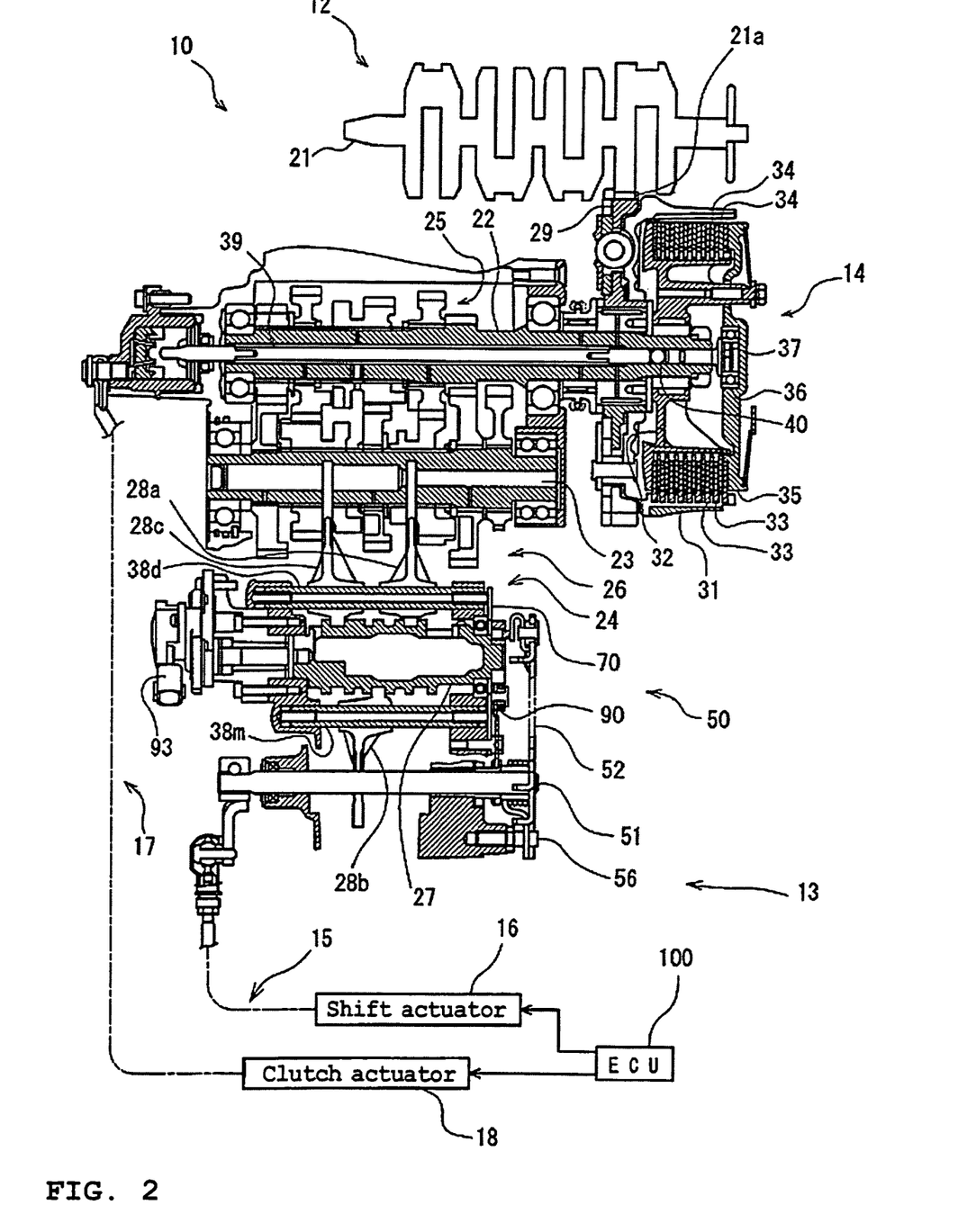
FIG. 2 shows a configuration of a power unit according to the embodiments.

Referring now to FIG. 2, in the exemplary embodiment, a clutch 14 associated with the power unit 10 can be a multi-plate friction clutch. The clutch 14 can include a cylindrical clutch housing 31, a cylindrical clutch boss 32, a plurality of friction plates 33 and clutch plates 34 serving as friction plates, and a pressure plate 35. Moreover, the clutch 14 can include a gear 29 to mesh with a gear 21a formed on a crankshaft 21 of the engine 12. Further, the clutch 14 can be of other types than a multi-plate clutch. For example, the clutch 14 can be an automatic centrifuge clutch using a centrifuge weight.

The clutch housing 31 can be formed in the shape of a cylinder and mounted to a main shaft 22 so as to be at least partly rotatable relative to the main shaft 22. On an inner peripheral surface of the clutch housing 31, a plurality of grooves extending in an axial direction of the main shaft 22 (e.g. a direction substantially parallel to the main shaft 22) can be formed.

Each friction plate 33 can be formed in the shape of a thin-plate ring. A plurality of teeth can be formed on an outer periphery of each friction plate 33. Engagement between the plural teeth formed on the outer periphery of the friction plate 33 and the plural grooves formed on the inner peripheral surface of the clutch housing 31 can enable each friction plate 33 to be mounted to the clutch housing 31 so as to be at least partly unrotatable relative to the clutch housing 31. Additionally, each friction plate 33 can be mounted so as to be at least partly slidable in the axial direction of the main shaft 22 with respect to the clutch housing 31.

The clutch boss 32 can be formed in the shape of a cylinder and be disposed in a radial direction of (e.g., a direction radially outward from) the main shaft 22, at an inner side of the clutch housing 31. Moreover, the clutch boss 32 can be mounted to the main shaft 22 so at to be at least partly unrotatable relative to the main shaft 22. On an outer peripheral surface of the clutch boss 32, a plurality of grooves extending in the axial direction of the main shaft 22 can be formed.

Each clutch plate 34 can be formed in the shape of a thin-plate ring. A plurality of teeth can be formed on an inner periphery of each clutch plate 34. Engagement between the plural teeth formed on the inner periphery of the clutch plate 34 and the plural grooves formed on the outer peripheral surface of the clutch boss 32 can allow each clutch plate 34 to be mounted to the clutch boss 32 so as to be at least partly unrotatable relative to the clutch boss 32. Additionally, each clutch plate 34 can be mounted so as to be at least partly slidable in the axial direction of the main shaft 22 with respect to the clutch boss 32.

Each friction plate 33 can be mounted to the clutch housing 31 such that its plate surface is substantially perpendicular to the axial direction of the main shaft 22. Each clutch plate 34 can be mounted to the clutch boss 32 such that its plate surface is substantially perpendicular to the axial direction of the main shaft 22. Each friction plate 33 and each clutch plate 34 can be disposed in an alternating manner in the axial direction of the main shaft 22.

The pressure plate 35 can be formed substantially in the shape of a disc and mounted so as to be at least partly slidable in the axial direction of the main shaft 22 with respect to the clutch boss 32. The pressure plate 35 can be mounted, so as to be freely rotatable, to one end of a push rod 37 (see the right side of FIG. 2), which can be disposed in the cylindrical main shaft 22, in contact with a bearing 36 such as a ball bearing.

In the cylindrical main shaft 22, a spherical ball 40 adjacent to the other end of the push rod 37 (the left end) can be provided. On the left side of the ball 40, a push rod 39 adjacent to the ball 40 can be provided.

One end of the push rod 39 (the left end) can protrude from the other end of the cylindrical main shaft 22 (the left end). The protruding one end of the push rod 39 can be connected to a clutch actuator 18 through a clutch power transmission means 17.

Transmission 13

Still referring to FIG. 2, a transmission 13 can be a multi-step transmission and include the main shaft 22, a drive shaft 23, and a gear selection mechanism 24. The main shaft 22 can be connected to the crankshaft 21 of the engine through the clutch 14. Thus, the main shaft 22 can rotate in accordance with rotation of the crank shaft 21 via the clutch 14. The main shaft 22 and the drive shaft 23 can be disposed substantially parallel to each other.

A plurality of gears 25 can be mounted on the main shaft 22. Further, a plurality of gears 26 can be mounted on the drive shaft 23 to correspond to the gears 25. Engagement between the plurality of gears 25 and the plurality of gears 26 can be achieved through selected gears, for example, only through a pair of selected gears. Among the plurality of gears 25 and 26, at least either gears except a selected gear of the gears 25, or gears except a selected gear of the gears 26, can be rotatable with respect to the main shaft 22 or the drive shaft 23. In other words, at least either unselected gears of the gears 25 or unselected gears of the gears 26 can be idle with respect to the main shaft 22 or the drive shaft 23. Thus, rotation transmission between the main shaft 22 and the drive shaft 23 can be achieved through the selected gears 25 and 26 which engage with each other.

Figure 4A:
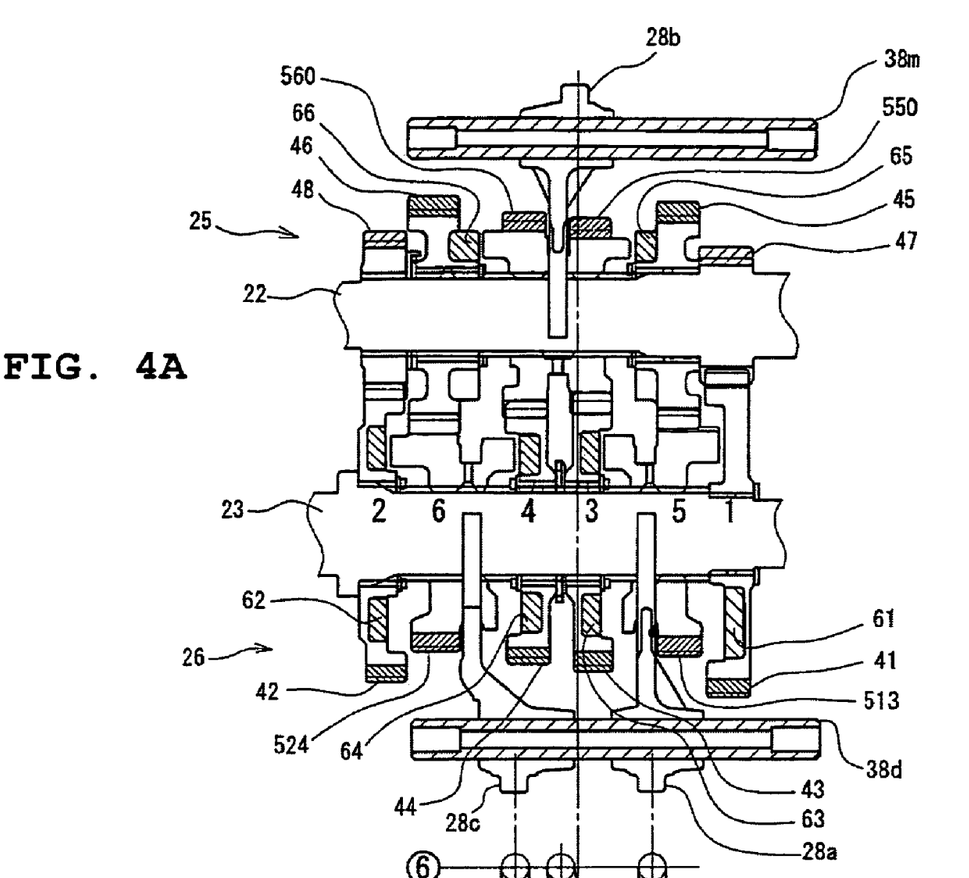
FIG. 4A shows a gear selection mechanism and FIG. 4B shows cam grooves.
Figure 4B:
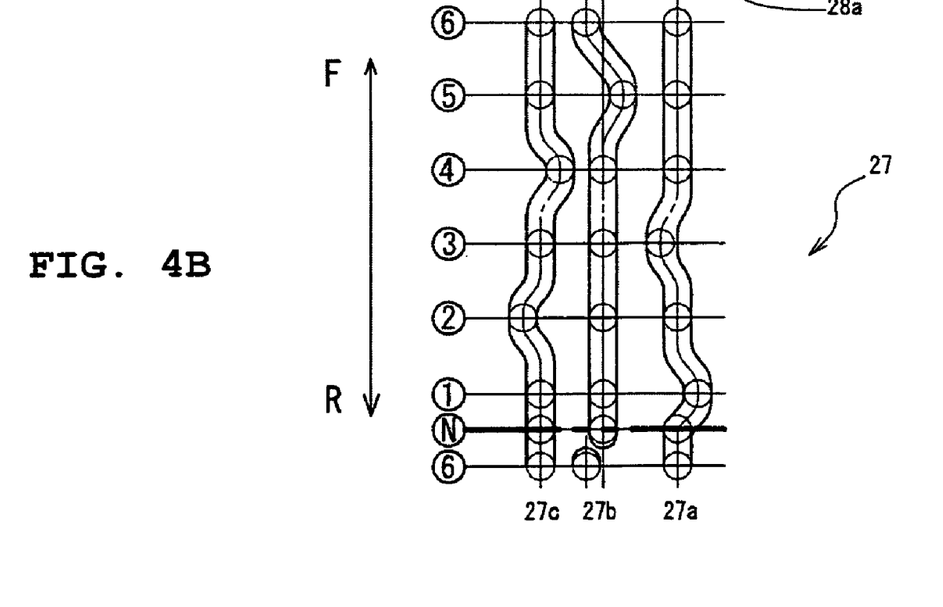

Selection of the gears 25 and 26 can be performed by the gear selection mechanism 24. More specifically, as shown in FIGS. 4A and 4B, a shift cam 27 of the gear selection mechanism 24 can perform selection of the gears 25 and 26. The shift cam 27 can be provided with a plurality of grooves, and can execute a designated rotation about an axis thereof. More specifically, cam grooves 27a, 27b, and 27c can be formed on an outer peripheral surface of the shift cam 27. Shift forks 28a, 28b, and 28c can move on shift fork shafts 38d, 38m and can engage the cam grooves 27a, 27b, and 27c, respectively. The shift forks can move a gear of the gears 25 in an axial direction of the main shaft 22, and move a gear of the gears 26 in an axial direction of the drive shaft 23.

More specifically, each of the shift forks can respectively engage with a gear 25 and a gear 26 to form a predetermined dog of the main shaft 22 and the drive shaft 23. When the shift cam 27 is rotated, each of the plural shift forks 28a, 28b, and 28c can be guided with the cam grooves 27a, 27b, and 27c to move in the axial direction of the main shaft 22 and the drive shaft 23. Each of the plural shift forks 28a, 28b, and 28c, which are moved in the axial direction of the main shaft 22 and the drive shaft 23, can engage or disengage the dog of the gears 25 and 26. This can allow for selection of a fixed gear and a slide gear to engage with each other among the gears 25 and 26.

More specifically, among the plural gears 25 and 26, only a pair of gears 25 and 26 positioned in accordance with a rotation angle of the shift cam 27 can be fixed by a spline via the dog with respect to the main shaft 22 and the drive shaft 23. This can determine a position of the gears, and through the gears 25 and 26, rotation transmission with a specified change gear ratio can be performed between the main shaft 22 and the drive shaft 23.

The shift actuator 16 and the clutch actuator 18 can each be connected to a control device 100 (see FIG. 2), such as an Electronic Control Unit (ECU), to be controlled by the control device 100.

Specifically, when a rider inputs a shift change command in an input device, the control device 100 can start shift control. Referring to FIG. 2, initially the control device 100 can control the clutch actuator 18 to be driven, and control the clutch 14 to be disengaged and thereby to have a disengaged state. Next, the control device 100 can control a shift actuator 16 to be driven, to cause the gear selection mechanism 24 to select the desired gears 25 and 26. Thereafter, the control device 100 can control the clutch actuator 18 again to be driven to engage the clutch 14.

The gear selection mechanism 24 can be connected to the shift actuator 16 through a shift power transmission mechanism 15. This can allow the shift actuator 16 to drive the gear selection mechanism 24.

Hereinafter, a state of shift change concerning the transmission 13 will be explained in detail using the drawings.

The transmission 13 can be a so-called constant-mesh dog transmission. As shown in FIGS. 4A, 4B, 5A, 5B, 6A and 6B, a fixed gear 48 of the gears 25 can be coupled to the main shaft 22. Engagement between the main shaft 22 and the fixed gear 48 can be achieved, for example, by serrations provided on the main shaft 22 and the fixed gear 48. In addition, a fixed gear 47 can be directly formed on the main shaft 22 as a tooth of a gear. That is, the fixed gears 47 and 48 can be structured so as to rotate with the main shaft 22 and thus, to not rotate relative to the main shaft 22.

Moreover, slide gears 550 and 560 can be fitted to the main shaft 22, and slide gears 513 and 524 can be fitted to the drive shaft 23. For example, the slide gears 550 and 560 can be fitted to the main shaft 22 by serrations, and the slide gears 513 and 524 can be fitted to the drive shaft 23 by serrations. Accordingly, the slide gears 550 and 560 can be structured so as rotate with the main shaft 22, and thus to not rotate relative to the main shaft 22. Similarly, the slide gears 513 and 524 can be structured so as to rotate with the drive shaft 23, and thus to not rotate relative to the drive shaft 23.

Still referring to FIGS. 4A, 4B, 5A, 5B, 6A and 6B, a first speed gear 41, a second speed gear 42, a third speed gear 43, and a fourth speed gear 44 of the gear 26 can engage with the drive shaft 23 via a bearing, for example. Thus, the first speed gear 41, the second speed gear 42, the third speed gear 43, and the fourth speed gear 44 can be idle with respect to the drive shaft 23. In addition, a fifth speed gear 45 and a sixth speed gear 46 can engage with the main shaft 22 via a bearing, for example. Thus, the fifth speed gear 45 and the sixth speed gear 46 can be idle with respect to the main shaft 22. The first speed gear 41, the second speed gear 42, the third speed gear 43, the fourth speed gear 44, the fifth speed gear 45, and the sixth speed gear 46 can be respectively provided with dogs 61, 62, 63, 64, 65, and 66 to obtain a spline fitted with a specified slide gear.

FIGS. 4A and 4B show a state wherein the transmission 13 is in a neutral position (as indicated by the highlighting of position "N" in FIG. 4B). The transmission 13 can be structured so that when the transmission 13 is in the neutral position, the rotational force of the main shaft 22 is not transmitted to the drive shaft 23. In other words, torque transmission from the main shaft 22 to the drive shaft 23 is not executed even though a gear of the gears 25 and a gear of the gears 26 are in a constant-mesh state. In meshing between the gear of the gears 25 and the gears of the gears 26 in the neutral position, the fixed gear 47 can mesh with the first speed gear 41. However, as the first speed gear 41 idles with respect to the drive shaft 23, torque transmission from the main shaft 22 to the drive shaft 23 is not executed.

The fifth speed gear 45 can mesh with the slide gear 513. However, as the fifth speed gear 45 idles with respect to the main shaft 22, torque transmission from the main shaft 22 to the drive shaft 23 is not executed. In a similar manner, generally, in meshing between a gear 25 and a gear 26, torque transmission from the main shaft 22 to the drive shaft 23 is not executed by a gear which idles between the main shaft 22 and the drive shaft 23.

Figure 5A:
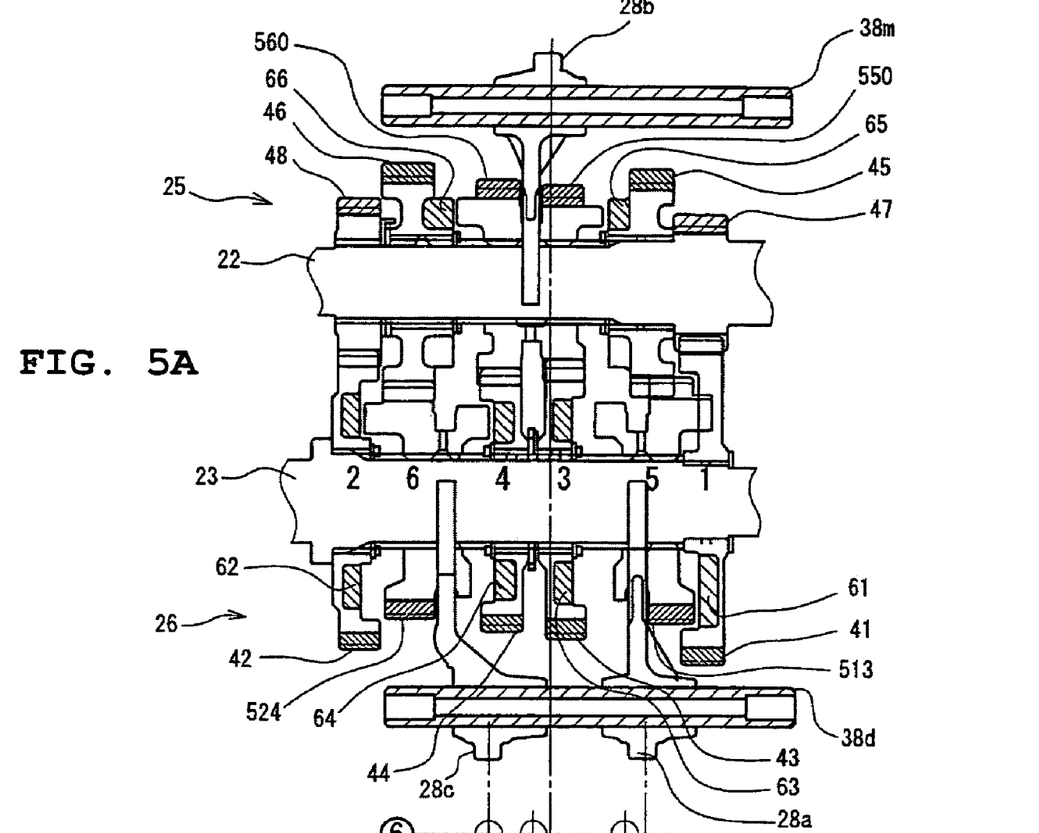
FIG. 5A shows the gear selection mechanism and FIG. 5B shows the cam grooves.

A plurality of shift steps associated with the electronically controlled transmission 13 can be set in accordance with at least a shape of the plurality of cam grooves 27a, 27b, 27c. For example, referring to FIGS. 4A, 4B, 5A and 5B, in an upshift operation comprising a shift step from the neutral position to a first speed, e.g., from position "N" to position "1", the shift cam 27 can rotate by a designated angle in the F direction. The shift fork 28a can move along an axial circumference (e.g., a circumference about an axis) of the shift cam 27, along the cam groove 27a formed on the shift cam 27. As shown in FIGS. 4A and 5A, the shift fork 28a, which moves along the axial circumference of the shift cam 27, moves on the fork shaft 38d in the axial direction, resulting that it moves on the drive shaft 23 by a designated distance in the axial direction.

Since the shift fork 28a moves on the fork shaft 38d and the drive shaft 23 in the axial direction, a spline fit can be achieved between the slide gear 513 and the dog 61. The slide gear 513 can rotate with the drive gear 23. This can allow torque transmission from the main shaft 22 to the drive shaft 23 via the fixed gear 47 and the first speed gear 41.

Figure 5B:
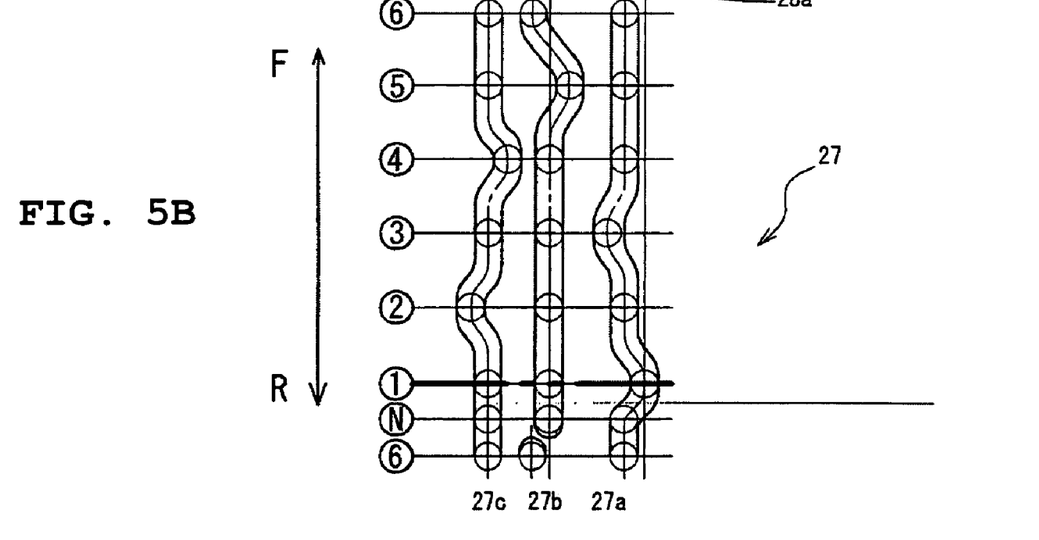
Figure 6A:
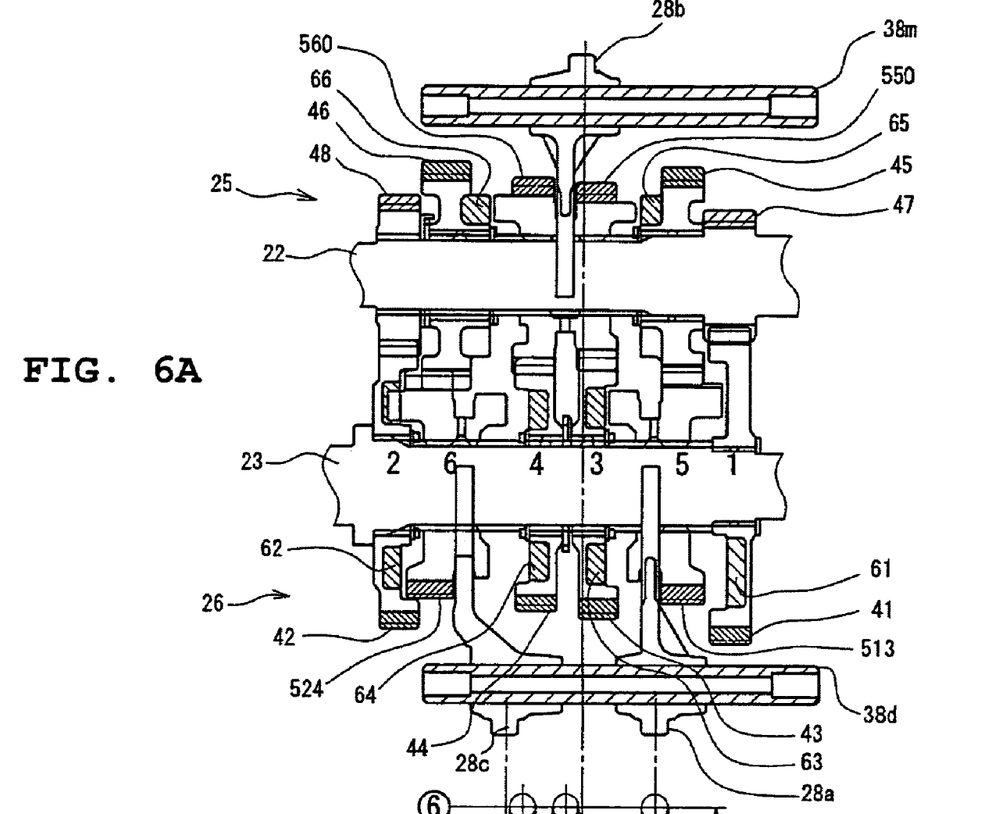
FIG. 6A shows the gear selection mechanism and FIG. 6B shows the cam grooves.

As shown in FIGS. 5A, 5B, 6A and 6B, in an upshift operation comprising another shift step from the first speed to a second speed, e.g., from position "1" to position "2", the shift cam 27 can rotate by a designated angle in the F direction. Accordingly, the shift fork 28a can move on the axial circumference of the shift cam 27 along the cam groove 27a formed on the shift cam 27. As shown in FIGS. 5A and 6A, the shift fork 28a, which can move along the axial circumference of the shift cam 27, can move by a specified distance in a reverse direction with respect to a position of the first speed gear 41 in the axial direction of the drive shaft 23. This can disconnect the spline fit between the slide gear 513 and the dog 61.

Figure 6B:
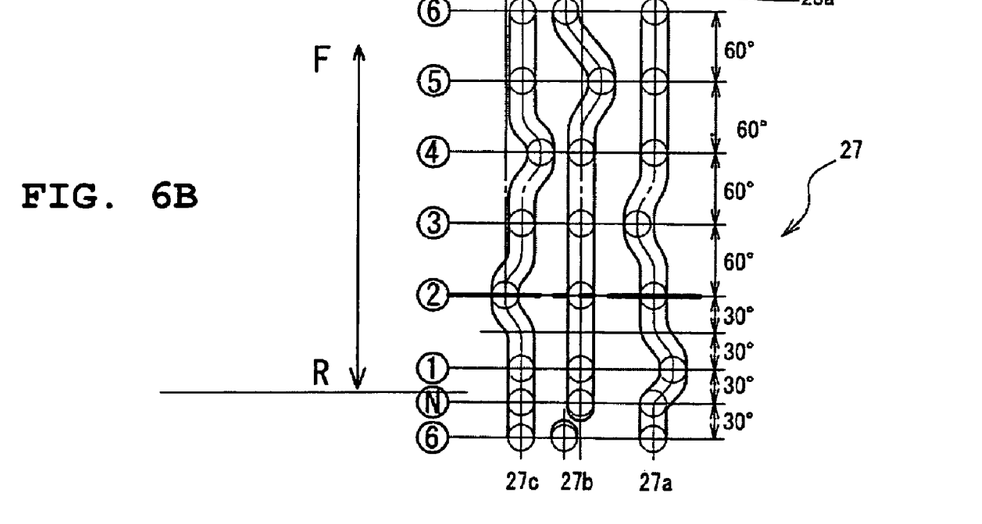

Moreover, as shown in FIGS. 5B and 6B, the shift fork 28c can move along the axial circumference of the shift cam 27 along the cam groove 27c formed on the shift cam 27. The shift fork 28c, which can move along the axial circumference of the shift cam 27, can move on the fork shaft 38d in the axial direction, resulting that it moves on the drive shaft 23 by a specified distance in the axial direction. Since the shift fork 28c moves on the fork shaft 38d and the drive shaft 23 in the axial direction, a spline fit can be achieved between the slide gear 524 and the dog 62. The slide gear 524 can rotate with the drive gear 23. This can allow torque transmission from the main shaft 22 to the drive shaft 23 via the fixed gear 48 and the second speed gear 42.

As shown in FIG. 6B, each shift step or position from the first speed (e.g., a position designated by "1") to the sixth speed (e.g., a position designated by "6") provided on the cam grooves of the shift cam 27 can be set for 60 degrees along the axial circumference of the shift cam 27. Moreover, a gear in/gear out operation of each shift fork in an upshift operation and downshift operation can be executed by rotation of the shift cam 27 by 30 degrees. More specifically, when the shift fork 28a disconnects from a position of serration fit between the slide gear 513 and the dog 61, the shift cam 27 can be rotated by 30 degrees in the F direction. Thereafter, when the shift fork 28c executes serration fit between the slide gear 524 and the dog 62, the shift cam 27 can rotate by 30 degrees in the F direction.

It may be understood, in view of FIGS. 4A, 4B, 5A, 5B, 6A and 6B, and the foregoing description, that a neutral position of the electronically controlled transmission 13 can be set below a lowest step of the shift steps, in a view of the shift cam 27 and cam grooves 27a, 27b, 27c. For example, in the view of FIGS. 4A, 4B, 5A, 5B, 6A and 6B, neutral position "N" is below position "1" corresponding to the lowest gear speed and lowest step of the shift steps. The shift steps can respectively correspond to respective gear speeds, e.g., a first gear speed through a sixth gear speed.

It may further be understood, in view of FIGS. 6A and 6B, and the foregoing description, that a rotation angle of the shift cam 27 between the neutral position "N" and the lowest step "1" can be different from that between any adjacent shift steps. For example, a rotation angle between the neutral position "N" and the lowest step "1" can be substantially 30 degrees, while a rotation angle between any of shift steps "1" to "2", or "2" to "3", and so on, can be substantially 60 degrees. Thus, the shift steps can correspond to rotation angles distributed along the shift cam 27 in even intervals. More specifically, the shift steps can each correspond to a rotation angle of substantially 60 degrees of the shift cam 27.

It may further be understood in view of the above that the transmission 13 can comprise a shift cam 27 coupled to the gears 25, 26 to at least partly control shifting of the gears 25, 26, wherein the shift cam 27 comprises a plurality of grooves 27a, 27b, 27c each with respective positions corresponding to gear speeds, and further including a neutral position, wherein the neutral position is below a position corresponding to a lowest gear speed in a view of at least a portion of the shift cam 27, and is between a position corresponding to the lowest gear speed and a position corresponding to a highest gear speed.

In addition, the neutral position can be a position rotated from the first speed position by 30 degrees in the R direction. If the transmission 13 is a return-type transmission, the neutral position and the sixth speed position can be discontinuous. As shown in FIGS. 4B, 5B, and 6B, the cam groove 27b can have a sixth speed position misaligned with the neutral position in the axial direction of the shift cam 27. A discontinuous portion of the cam groove 27b is referred to as a stopper portion for the sake of convenience. This stopper portion can prevent the shift cam 27 from rotating in the F direction even when the shift actuator 16 rotates the shift cam 27 in the F direction from the sixth speed position.

Additional or alternative structures can be provided for preventing the shift cam 27 from rotating in the F direction from the sixth speed position even when the shift cam 27 is operated to rotate in the F direction (i.e., additionally or alternatively to misalignment of the sixth speed position and the neutral position in the cam groove 27b as described above). For example, the sixth speed position and the neutral position may be misaligned in the cam groove 27a. Moreover, the sixth speed position and the neutral position may be misaligned in the cam groove 27c.

Moreover, regulation of moving of the shift fork 28b between the neutral position and the sixth speed position is not limited to discontinuity in any of the cam grooves. For example, a barrier to act as a stopper member (not shown) may be provided on, for example, an axis of the shift cam 27 even when the cam grooves 27a, 27b, and 27c are continuous. In such a case, any of the shift forks can be prevented from moving between the sixth speed position and the neutral position by the stopper member provided on the axis of the shift cam 27.

Moreover, regulation of moving of the shift fork 28b between the neutral position and the sixth speed position is not limited to the shape of a surface of the shift cam 27. For example, in a case where the transmission is in the neutral position, when the rider inputs a downshift command in an input device by mistake, the control device 100 may be configured so as to not output a drive command to the shift actuator 16 or the clutch actuator 18 and may cancel the rider's wrong command. On the other hand, in a case where the transmission is in the sixth speed position, when the rider inputs an upshift command in the input device by mistake, the control device 100 may be configured so as to not output a drive command to the shift actuator 16 or the clutch actuator 18 and may cancel the rider's wrong command.

Figure 6C:
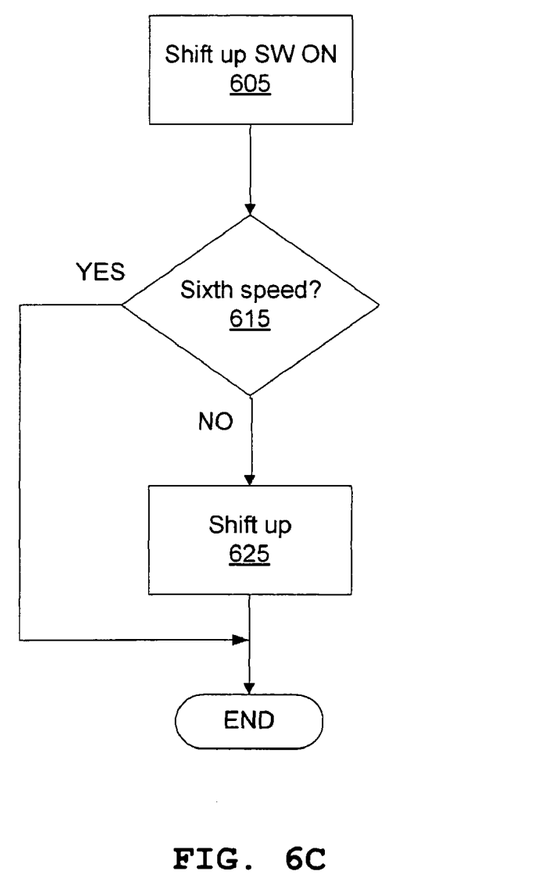
FIGS. 6C and 6D show flowcharts illustrating prevention control by a control device for preventing error in shifting by the transmission.
Figure 6D:
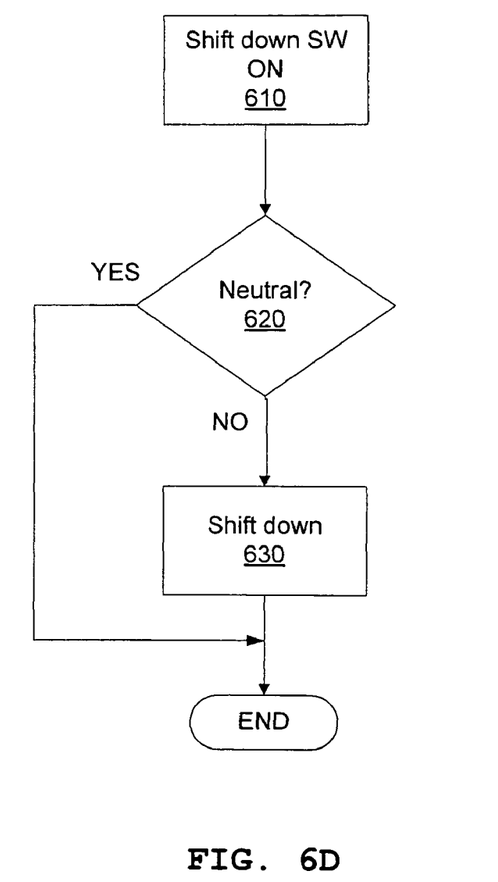

FIGS. 6C and 6D illustrate examples of regulation of moving of the shift fork 28b between the neutral position and the sixth speed position as described above. FIGS. 6C and 6D show process flows that can be executed by the control device 100. The process flows can be, for example, implemented with computer-executable instructions (e.g., "firmware") stored on a data storage medium such as ROM (read-only memory) or RAM (random access memory). The control device 100 can include one or more processors that can execute the instructions. Additionally or alternatively, the control device 100 can include integrated circuit logic, such as one or more ASICs (Application Specific Integrated Circuits) that can execute the process flows.

Referring to FIG. 6C, a process flow executed by the control device 100 can comprise receiving or detecting a "Shift up SW ON" status (block 605), corresponding to an upshift command input by a rider, for example. It can then be determined whether or not the transmission 13 is in a sixth speed status or position (block 615). If yes, the process can end, that is, the control device 100 can be configured so as to not output a drive command to the shift actuator 16 or the clutch actuator 18 and may cancel the rider's wrong command. If no, a shift up operation can be executed (block 625).

Referring to FIG. 6D, another process flow executed by the control device 100 can comprise receiving or detecting a "Shift down SW ON" status (block 610), corresponding to an downshift command input by a rider, for example. It can then be determined whether or not the transmission 13 is in a neutral status or position (block 620). If yes, the process can end, that is, the control device 100 can be configured so as to not output a drive command to the shift actuator 16 or the clutch actuator 18 and may cancel the rider's wrong command. If no, a shift down operation can be executed (block 630).

In view of the above, it may be understood that stopper means for preventing any of the shift forks from moving between the sixth speed position and the neutral position can be constituted by control of the control device 100 to execute prevention control for preventing the shift cam 27 from rotating between the neutral position and the highest step of the shift steps. For example, the prevention control can be control for the shift actuator 16, or control for the clutch actuator 18.

The shift cam 27 can rotate in accordance with the operation of the shift actuator 16. Hereinafter, a structure associated with the rotation of the shift cam 27 will be explained.

As shown in FIG. 2, when the shift actuator 16 is operated, a drive force of the shift actuator 16 can be transmitted to a shift shaft 51 via the shift power transmission mechanism 15. The shift shaft 51 can be a shaft that provides a rotational force that results in rotation of the shift cam 27 about an axis thereof. A shift change command from the rider can allow the shift actuator 16 to execute an operation to output a specified drive force to rotate the shift shaft 51 in a designated direction. The designated direction can vary to be in opposite directions respectively corresponding to an upshift change and a downshift change.

Figure 3A:
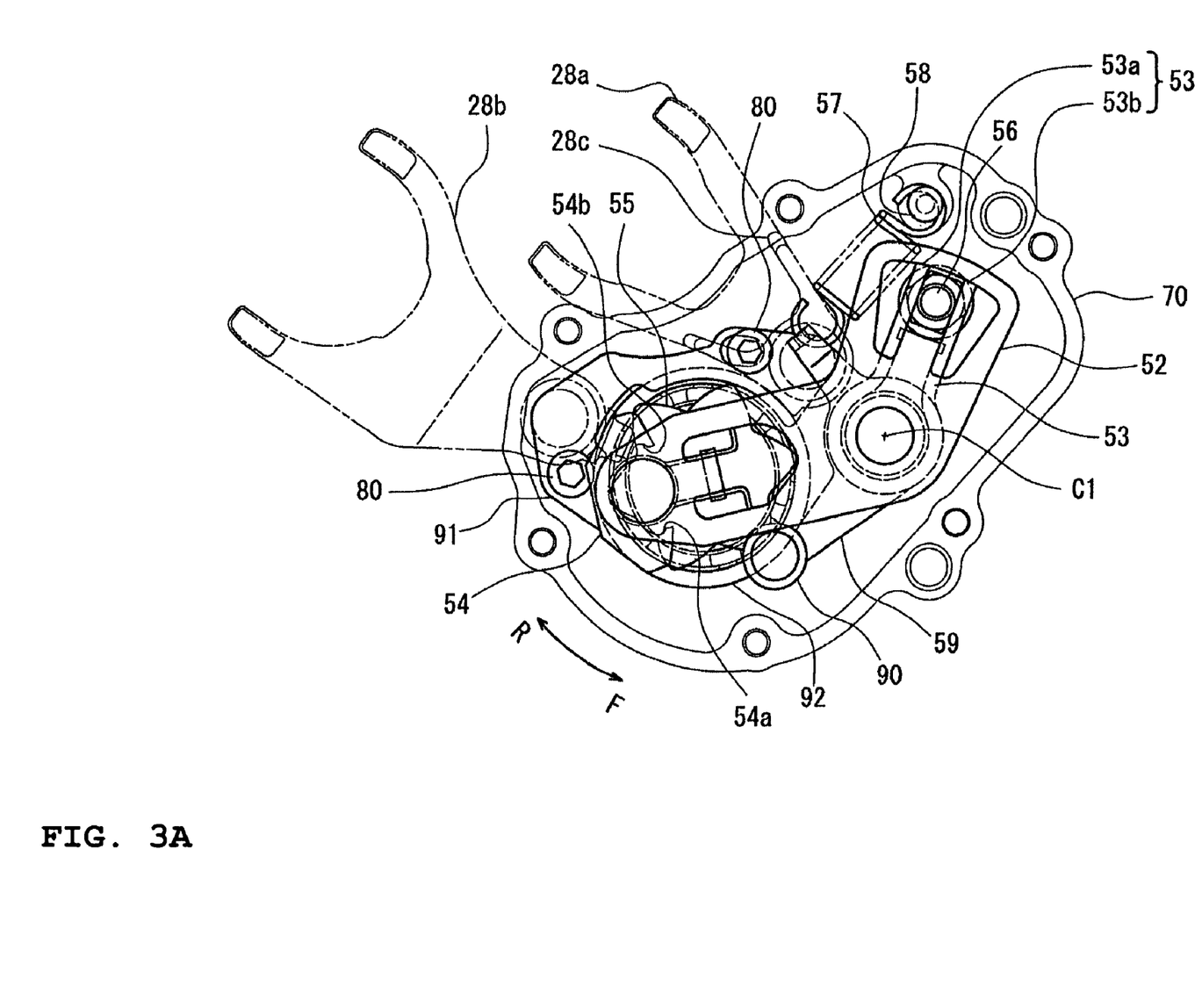
FIG. 3A is a front view of a feed device according to the embodiments.

A feed device 50 can be provided on one end of the shift cam 27. The feed device 50 can be a mechanism that rotates the shift cam 27 by a designated angle utilizing the rotational force of the shift shaft 51 that is rotated by the drive force of the shift actuator 16. The feed device 50 can be disposed on a case 70. In FIG. 2, the case 70 is disposed on the right end of the shift cam 27, and can regulate an axial position of the shift cam 27. A plurality of openings (not shown) can be formed in the case 70. Among the plural openings, the shift cam 27 can pass through one opening and the shift shaft 51 can pass through another opening. Due to the rotation of the shift cam 27, a shift arm 52 can be rotated. For example, in an upshift operation, as shown in FIG. 3A, the shift arm 52 can rotate counterclockwise. The shift arm 52 can have a center C1 of the shift shaft 51 as a rotational center Moreover, a base 91 can act as a lid having a function of regulating an axial position of the shift cam 27 with respect to the shift shaft 51. The base 91 can be fixed in an inner portion of the case 70 by, for example, a bolt 80. Moreover, a ball bearing 92 can be provided on an inner side (the left side in FIG. 2) of the base 91 and the shift cam 27 can be fitted to the ball bearing 92. This can allow the shift cam 27 to stably rotate about a center C2 (see FIG. 3B).

A return spring 53 provided on a rear side (see the left side in FIG. 2) of the shift arm 52 can urge the shift shaft 51 and the shift arm 52 to return to a designated neutral position before rotating. The return spring 53 can be configured to constantly abut on a stopper pin 56 at a left side portion 53a or a right side portion 53b, and to urge the shift shaft 51 and the shift arm 52 such that they return to the designated neutral position before rotating. For example, in an upshift operation, the left side portion 53a of the return spring 53 of FIG. 3A can be separated from the stopper pin 56 to make a clearance. However, due to the urging force of the return spring 53, the left side portion 53a of the return spring 53 can attempt to abut on the stopper pin 56, so that the shift shaft 51 and the shift arm 52 are returned to the designated neutral position before rotating.

A claw 54 can be provided on one end (see the left side of FIG. 3A) of the shift arm 52. The claw 54 can be provided with pin holes 54a and 54b. In addition, the claw 54 and the shift arm 52 can be integrally formed. The claw 54 can rotate about the center C1 of the shift shaft 51 in accordance with the rotation of the shift arm 52. Moreover, the claw 54 can rotate a segment 55 in response to the rotation of the shift arm 52.

Figure 3B:
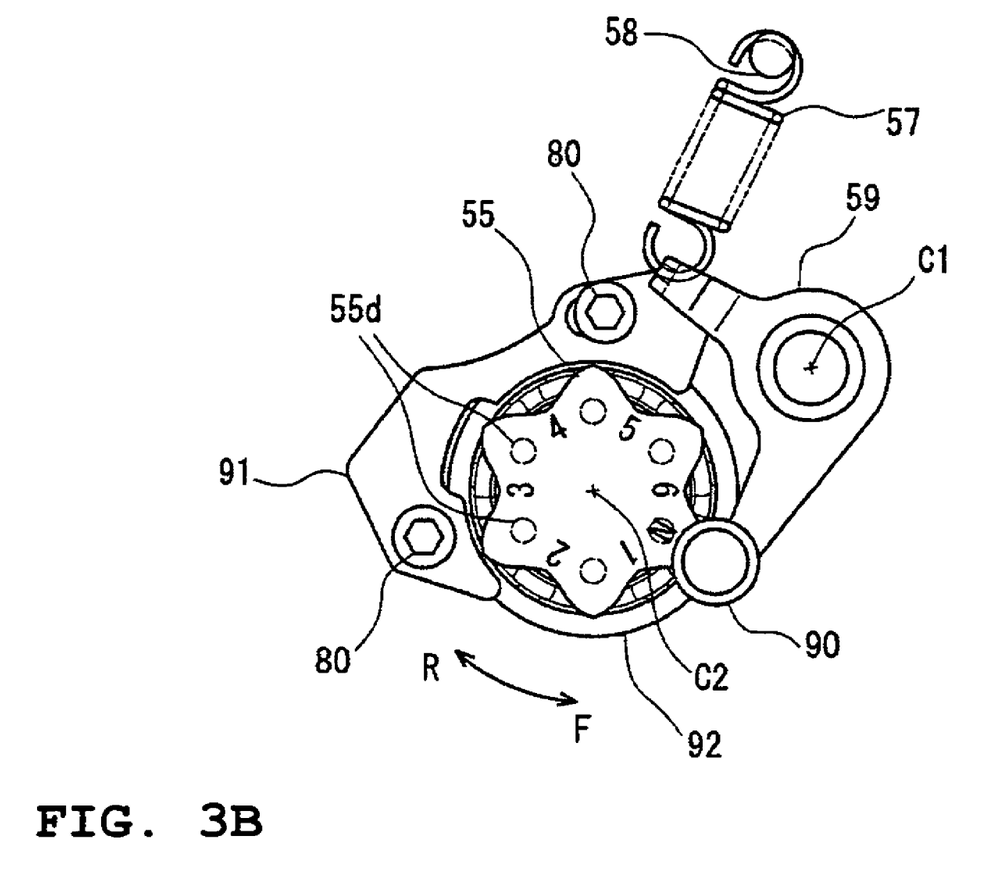
FIG. 3B is a front view of a segment part of the feed device.

Referring to FIG. 3B, the segment 55 can rotate about the center C2 of the shift cam 27. The segment 55 can have a plurality of pins 55d on a surface thereof. In the illustrated exemplary embodiment, six pins 55d are provided. When the shift shaft 51 and the shift arm 52 are positioned at the designated neutral position before rotating, two adjacent pins 55d can be respectively received within the pin hole 54a or the pin hole 54b. Here, when an upshift operation is executed in the transmission 13, in accordance with the counterclockwise rotation of the shift arm 52, the pin hole 54b can hold one pin 55d to rotate the segment 55 in the counterclockwise direction. Additionally, one pin 55d can be held by the claw 54 in a position where a curved surface 55c of the segment 55 abuts on a stopper bearing 90.

Figure 3C:
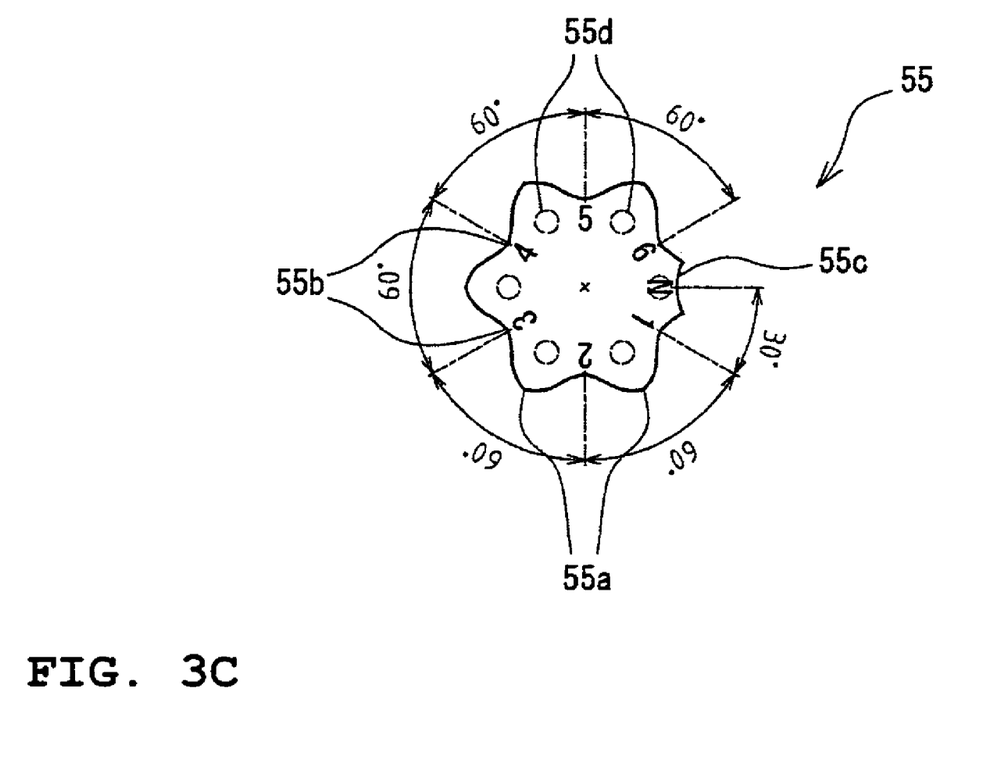
FIG. 3C is a front view illustrating further details of the segment part.

As shown in FIG. 3C, the segment 55 can be in the shape of a star formed by superimposing two triangles. The segment 55 can have an outline including projections 55a and depressions 55b. Each depression 55b can act as an enter or receiving position of each gear of the shift cam 27. In the illustrated exemplary embodiment, the transmission 13 is a six-speed transmission, and the neutral position is below the first speed position. Because of this, in the depressions 55b of the segment 55, starting from the first speed (e.g., as designated by "1" in FIG. 3C), the second speed (e.g., as designated by "2" in FIG. 3C), the third speed (e.g., as designated by "3" in FIG. 3C), and so on, up to the sixth speed (e.g., as designated by "6" in FIG. 3C), can be sequentially provided in the clockwise direction. The neutral position of the segment 55 (e.g., as designated by "N" in FIG. 3C) can correspond to the curved surface 55c, which can be formed as a surface on an end of an intermediate portion or projection, formed between the depressions 55b respectively corresponding to the sixth speed and the first speed, with a height intermediate between a projection 55a and a depression 55b.

In view of the foregoing, it may be understood that an angle of rotation of the segment 55 between the intermediate portion having the surface 55c, and a position (e.g., a depression 55b) corresponding to either the lowest gear speed (e.g., the first gear speed) or the highest gear speed (e.g. the sixth gear speed) can substantially half of an angle of rotation of the segment 55 between a position 55b corresponding to the lowest gear speed and a position corresponding to the highest gear speed.

Returning now to FIGS. 3A and 3B, the feed device 50 can include a stopper spring 57. The stopper spring 57 can have one end supported by a pin 58 provided in the feed device 50, and the other end can support a stopper lever 59. For example, the stopper spring 57 can be a coil spring. The stopper spring 57 can be connected to the pin 58 and the stopper lever 59 in a tension state of the spring. The stopper lever 59 can be provided on a back side (the left side in FIG. 2) of the shift arm 52 in FIG. 3A, and rotate about the rotational center C1 of the shift arm 52. Because of this, the stopper spring 57 can allow the stopper bearing 90 to constantly abut on the segment 55 by an urging force of the spring in a compressing direction. Since the stopper bearing 90 receiving the urging force of the stopper spring 57 abuts on the segment 55, the segment 55 can stably rotate about the center C2 of the shift cam 27 in response to the operation of the claw 54.

As shown in FIG. 2, a shift cam potentiometer 93 can be provided on a side of the feed device 50 across the shift cam 27. The shift cam potentiometer 93 can monitor the rotation angle of the shift cam 27 so that the rotation angle does not exceed a designated angle provided by the control device 100.

Operation and Effects

As noted previously, the transmission 13 can be a return-type electronically controlled transmission. In the transmission 13, the neutral position is so-called bottom neutral and is set below the first speed position. This allows the transmission 13 to have a clear distinction in terms of positional relationship between the neutral position and positions of other shift steps compared to a case where the neutral position is provided between the first speed and the second speed.

In addition, the neutral position of the transmission 13 can be set on a rotation angle of the shift cam 27 which is different from the rotation angle of other shift steps excluding the neutral position. Because of this, a shift operation to the neutral position has a clear distinction in terms of numerical values compared to other shift steps, which can facilitate control by the control device 100. This can allow the transmission 13 to execute shifting to the neutral position accurately. Consequently, it is possible to provide a return-type electronically controlled transmission capable of shifting to the neutral position reliably.

Moreover, in the transmission 13, other shift steps excluding the neutral position can be provided by a constant rotation angle of the shift cam 27. As each shift step can set for a rotation angle placed at even intervals, when a shift change is executed, the shift cam 27 can be rotated by a constant driving force compared to a case where the shift steps are not provided at even internals. In addition, regarding control by the control device 100, the shift operation to the neutral position has a more explicit distinction in terms of numerical values compared to other shift steps. This allows the transmission 13 to execute the shifting to the neutral position easily and accurately in terms of control. Consequently, it is possible to execute reliable shifting to the neutral position.

Further, in a case of the six-speed transmission as described above, compared to, for example, a five-speed transmission, a reduction ratio which is more appropriate or smaller can be obtained. Because of this, when the transmission 13 is used in an actual machine such as a vehicle, efficient driving can be executed through an appropriate reduction ratio. Moreover, when the six-speed transmission 13 is used in a motorcycle 1 as described above, gear selection in accordance with a running state can be appropriately conducted when the motorcycle 1 is running.

Still further, in the transmission 13, the rotation angles of the shift cam 27 from the first speed to the sixth speed can be set to be 60 degrees. Because of this, a rotation angle of the shift cam 27 to each shift step can be constant while the entire axial circumference of the shift cam 27 is effectively utilized. By contrast, for example, when each shift step from the first speed to the sixth speed is set for 50 degrees, moving distance of the shift fork 28a, b, c during the rotation of the shift cam 27 by 50 degrees is increased, compared to a case where each shift step is set for 60 degrees. This increases the driving force necessary for the rotation of the shift cam 27. Thus, the transmission 13 can be advantageously constituted as a transmission with a reduced driving force necessary for the shift operation, while utilizing the shift cam 27 effectively.

Still further, while each shift step from the first speed to the sixth speed can be provided by rotation of the shift cam 27 for 60 degrees, the neutral position of the transmission 13 can set to be a position rotated by 30 degrees below the first speed or a position rotated by 30 degrees above the sixth speed. That is, the neutral position can be provided at 30 degree intervals between the first speed and the sixth speed (see FIG. 3C). Moreover, a rotation angle of the shift cam 27 necessary for the shift change to each shift step can be set to be half for a gear in/gear out operation. In addition, a moving distance of the shift fork 28a, b, c in the axial direction of the shift cam 27 with respect to each slide gear can be set to be half for a gear in/gear out operation. In other words, the operation of each shift fork for a gear in/gear out operation can be executed by the rotation of the shift cam 27 for 30 degrees. Accordingly, in a shift operation to the neutral position of the transmission 13, the moving operation of the shift fork 28a on the shift cam 27 can closely resemble the moving operation of each shift fork on the shift cam 27 in a gear out operation even though the direction may be reversed in the axial direction of the shift cam 27. Consequently, it is possible to execute reliable shifting to the neutral position.

As noted previously, the transmission 13 can be so-called bottom neutral. Moreover, the transmission 13 can include stopper means that prevents moving between the neutral position and the highest step of the shift steps. This allows for reliable shifting to the neutral position. Moreover, the shifting to the lowest step of the shift steps can be performed smoothly since the shift direction from the neutral position is limited to the lowest step of the shift steps.

Moreover, the stopper means can be a stopper portion configured by making the cam groove 27b discontinuous. Configuring a stopper portion in this manner can avoid an additional step in the fabrication of the shift cam 27, as by contrast might be required for stopper means of another kind. Consequently, the stopper means effective as described above can be easily provided. As a result, the return-type electronically controlled transmission capable of shifting to the neutral position reliably can be provided.

Moreover, the stopper means may be provided on the shift cam 27 as the stopper member. The stopper member can act as a barrier formed on the shift cam 27 so that at least one portion between the neutral position and the sixth speed is discontinuous. In such a case, it is unnecessary to secure an additional space compared to a case where another barrier instead of the stopper member is provided on a portion other than the shift cam 27. Consequently, the stopper means effective as described above can be easily provided. As a result, the return-type electronically controlled transmission capable of shifting to the neutral position reliably can be provided.

Further, the transmission 13 can include the clutch actuator 18 for operating the clutch 14, the shift actuator 16 for rotating the shift cam 27, and the control device 100 for controlling the operation of the clutch actuator 18 and the shift actuator 16. Consequently, in the transmission 13, moving between the neutral position and the highest step of the shift steps can be regulated due to the control by the control device 100. As a result, the return-type electronically controlled transmission capable of shifting to the neutral position reliably can be provided.

As noted previously, the transmission 13 can be provided with a motorcycle 1, which is a straddle-type vehicle. The transmission 13 can be a return-type electronically controlled transmission, and be a so-called bottom neutral transmission where the neutral position is located below the lowest step of the shift steps. Thus, in a case where the shift change is executed when the vehicle is running, shifting to the neutral position by mistake can be prevented, while shifting to the neutral position can be reliably executed. As a result, it is possible to provide a straddle-type vehicle having a return-type electronically controlled transmission capable of shifting to the neutral position reliably.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims.

What is claimed is:

1. An electronically controlled transmission having a return-type shift pattern connected to a crank shaft of an engine via a clutch, the transmission comprising:
   a main shaft for rotating in accordance with rotation of the crank shaft via the clutch;
   a drive shaft for rotating in accordance with rotation of the main shaft;
   a plurality of first gears for rotating about the main shaft;
   a plurality of second gears for rotating about the drive shaft to engage the plurality of first gears;
   a plurality of shift forks for moving a gear of the plurality of first gears in an axial direction of the main shaft and moving a gear of the plurality of second gears in an axial direction of the drive shaft;
   a shift cam provided with a plurality of grooves, the shift cam for executing a designated rotation about an axis thereof;
   a clutch actuator for operating the clutch;
   a shift actuator for rotating the shift cam;
   a control device for electronically controlling the clutch actuator and the shift actuator,
   wherein
      a plurality of shift steps associated with the electronically controlled transmission are set in accordance with at least a shape of the plurality of grooves,
      a neutral position of the electronically controlled transmission is set below a lowest step of the shift steps,
      a rotation angle of the shift cam between the neutral position and the lowest step is different from that between any adjacent shift steps, and
      the control device electronically executes prevention control that electronically prevents the shift cam from rotating between the neutral position and a highest step of the shift steps.

2. The electronically controlled transmission according to claim 1, wherein the shift steps correspond to rotation angles distributed along the shift cam in even intervals.

3. The electronically controlled transmission according to claim 1, wherein the shift steps correspond respectively to a first speed through a sixth speed.

4. The electronically controlled transmission according to claim 1, wherein the shift steps each correspond to a rotation angle of substantially 60 degrees of the shift cam.

5. The electronically controlled transmission according to claim 4, wherein the neutral position corresponds to a position rotated by substantially 30 degrees from a first speed of the shift steps.

6. The electronically controlled transmission according to claim 1, wherein the stopper assembly is provided on the shift cam, and the stopper assembly includes a stopper portion formed so that at least one portion between the neutral position and the highest step of the shift steps is discontinuous.

7. The electronically controlled transmission according to claim 6, wherein the at least one portion that is discontinuous includes a misalignment between the neutral position and the highest step of the shift steps.

8. The electronically controlled transmission according to claim 1, wherein the prevention control is a control for the shift actuator.

9. A straddle-type vehicle comprising the electronically controlled transmission according to claim 1.

10. A vehicle transmission, comprising:
    a plurality of gears;
    a shift cam coupled to the gears to at least partly control shifting of the gears; and
    a control device for electronically controlling a clutch actuator and a shift actuator;
    wherein
       the shift cam comprises a plurality of grooves each with respective positions corresponding to gear speeds, and further including a neutral position, wherein the neutral position is below a position corresponding to a lowest gear speed in a view of at least a portion of the shift cam, and is between a position corresponding to the lowest gear speed and a position corresponding to a highest gear speed, and
       the control device electronically executes prevention control that electronically prevents the shift cam from rotating between the neutral position and a highest step of the shift steps.

11. The vehicle transmission of claim 10, wherein a rotation angle of the shift cam between the neutral position and a lowest step corresponding to the lowest gear speed is different from that between any adjacent shift steps, respectively corresponding to other gear speeds.

12. The vehicle transmission of claim 10, further comprising a segment portion formed as alternating projections and depressions, wherein an intermediate portion with a height intermediate between a projection and a depression corresponds to the neutral position.

13. The vehicle transmission of claim 12, wherein the intermediate portion comprises a surface to abut on the stopper assembly.

14. The vehicle transmission of claim 13, wherein the intermediate portion is between a projection corresponding to the lowest gear speed and a projection corresponding to a highest gear speed.

15. The vehicle transmission of claim 12, wherein an angle of rotation of the segment portion between the intermediate portion and a position corresponding to either the lowest gear speed or the highest gear speed is substantially half of an angle of rotation of the segment portion between a position corresponding to the lowest gear speed and a position corresponding to the highest gear speed.

16. The vehicle transmission of claim 10, wherein the respective positions correspond to six gear speeds.

17. A vehicle transmission, comprising:
- a gear assembly;
- a shift control assembly for at least partly controlling the gear assembly; and
- a control device for electronically controlling a clutch actuator and a shift actuator;

wherein
- the shift control assembly is configured to correspond to gear speeds including a neutral position, and the neutral position is below a position corresponding to a lowest gear speed in a view of at least a portion of the shift control assembly, and is between a position corresponding to the lowest gear speed and a position corresponding to a highest gear speed, and
- the control device electronically executes prevention control that electronically prevents the shift cam from rotating between the neutral position and a highest step of the shift steps.

* * * * *